US008574789B2

(12) United States Patent
Shelnutt et al.

(10) Patent No.: US 8,574,789 B2
(45) Date of Patent: *Nov. 5, 2013

(54) DENDRITIC METAL NANOSTRUCTURES FOR FUEL CELLS AND OTHER APPLICATIONS

(75) Inventors: John A. Shelnutt, Tijeras, NM (US); Wen Li, Ypsilanti, MI (US); Yujiang Song, Albuquerque, NM (US); Michael A. Hickner, Albuquerque, NM (US)

(73) Assignees: Toyota Motor Engineering & Manufacturing North America, Inc., Erlanger, KY (US); Sandia Corporation, Albuquerque, NM (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/564,510

(22) Filed: Nov. 29, 2006

(65) Prior Publication Data

US 2007/0231674 A1    Oct. 4, 2007

Related U.S. Application Data

(63) Continuation-in-part of application No. 10/887,535, filed on Jul. 8, 2004, now Pat. No. 7,374,599, and a continuation-in-part of application No. 11/329,853, filed on Jan. 11, 2006.

(60) Provisional application No. 60/788,003, filed on Mar. 31, 2006, provisional application No. 60/643,283, filed on Jan. 12, 2005.

(51) Int. Cl.
*H01M 4/02* (2006.01)
*H01M 8/10* (2006.01)
*H01M 4/36* (2006.01)

(52) U.S. Cl.
USPC ............ 429/524; 429/523; 429/483; 429/482

(58) Field of Classification Search
USPC ................... 429/524, 523, 483, 482
See application file for complete search history.

(56) References Cited

U.S. PATENT DOCUMENTS

| 4,409,129 A * | 10/1983 | Takeuchi et al. ............. 502/185 |
| 4,568,435 A | 2/1986 | Shelnutt |
| 5,069,988 A | 12/1991 | Tomantschger et al. |

(Continued)

FOREIGN PATENT DOCUMENTS

| DE | 10318863 A1 | 11/2004 |
| WO | WO-8902660 | 3/1989 |
| WO | WO 2006004023 A1 * | 1/2006 |

OTHER PUBLICATIONS

Song, Y., Y. Yang, C.J. Brinker, F. van Swol, and J.A. Shelnutt. "Controlled Synthesis of 2-D and 3-D Dendritic Platinum Nanostructures," J. Am. Chem. Soc., vol. 126, No. 2, p. 635-645 (2004).

(Continued)

*Primary Examiner* — Helen O Conley
(74) *Attorney, Agent, or Firm* — Gifford, Krass, Sprinkle, Anderson & Cikowski, P.C.

(57) ABSTRACT

Embodiment of the present invention relate to dendrimers useful for application as catalysts, in particular as improved electrocatalysts for polymer electrolyte membrane fuel cells (PEM-FCs). Methods of preparing such catalysts are described. Examples include dendritic nanostructured metal catalysts, such as platinum and platinum-alloy catalysts.

26 Claims, 11 Drawing Sheets

TEM images of dendritic platinum nanosheets (a) and commercial platinum black (b) used for the preparation of MEAs.

(56) References Cited

U.S. PATENT DOCUMENTS

| | | |
|---|---|---|
| 5,137,461 A | 8/1992 | Bindra et al. |
| 5,215,631 A | 6/1993 | Westfall |
| 5,316,990 A | 5/1994 | Cooper et al. |
| 5,372,981 A | 12/1994 | Witherspoon |
| 5,585,457 A | 12/1996 | Newkome et al. |
| 5,958,590 A | 9/1999 | Kang et al. |
| 6,245,707 B1 | 6/2001 | Chu et al. |
| 6,627,048 B1 | 9/2003 | Shelnutt et al. |
| 7,374,599 B1 * | 5/2008 | Shelnutt et al. ............... 75/370 |
| 2003/0035991 A1 | 2/2003 | Colombo et al. |
| 2003/0182985 A1 | 10/2003 | Fleury et al. |
| 2003/0200834 A1 | 10/2003 | Zeller et al. |
| 2004/0010160 A1 | 1/2004 | Coleman et al. |
| 2004/0236157 A1 | 11/2004 | Heilgendorff et al. |
| 2005/0014060 A1 | 1/2005 | Suzuki |
| 2005/0221975 A1 | 10/2005 | Renock et al. |
| 2006/0003401 A1 | 1/2006 | Lee et al. |
| 2006/0057355 A1 | 3/2006 | Suzuki et al. |
| 2006/0135359 A1 * | 6/2006 | Adzic et al. ................... 502/326 |
| 2006/0251953 A1 * | 11/2006 | Li et al. ............................ 429/44 |
| 2007/0212591 A1 * | 9/2007 | Miyazaki et al. .............. 429/40 |

OTHER PUBLICATIONS

Song, Y., Y. Jiang, H. Wang, D.A. Pena, Y. Qiu, J.E. Miller, and J.A. Shelnutt. "Platinum nanodendrites." Nanotechnolo•17, p. 1300-1308 (2006).

Lefevre, M., J.P. Dodelet, P. Bertrand. "O-2 Reduction in Pem Fuel Cells: Activity and Active Site Structural Information for Catalysts Obtained by the Pyrolysis at High Temperature of Fe Precursors." Journal of Physical Chemistry B104, p. 11238-11247 (2000).

Widelov, Anders. "Pyrolysis of iron and cobalt porphyrins sublimated onto the surface of carbon black as a method to prepare catalysts for $O_2$ reduction." Electrochimica Acta Dec. 1993, vol. 38, No. 17, p. 2493-2502.

\* cited by examiner

Figure 1. TEM images of dendritic platinum nanosheets (a) and commercial platinum black (b) used for the preparation of MEAs.

Figure 2. HAADF STEM images of dendritic platinum foam-like nanospheres used in preparation of the MEA.

Figure 3. Short-term durability tests at 0.5 V potentiostatic hold for 7 mg Pt/cm$^2$ loadings for dendritic nanospheres (1), nanosheets (2) and platinum black (3).

Figure 4. Polarization curves before and after 75 hour potentiostatic tests on MEAs prepared with Pt nanosheets at time 0 (♦) and 75 h (◊) and with Pt black at time 0 (▲) and 75 h (△) for loadings of 7 mg/cm$^2$.

Figure 5. Short-term durability tests at 0.5 V potentiostatic hold for MEAs made with Pt nanospheres and Pt black.

Figure 6. Cyclic voltammagrams for (a) Pt black, and (b) Pt nanosheets. Solid curves are at time 0 and the dashed curves are at 75 h.

Figure 7. Comparison of CV features for Pt sheets (solid line) and Pt black (dashed line) before fuel cell test.

Figure 8. Cyclic voltammagrams for the 2-mg Pt/cm$^2$ MEAs for the Pt nanospheres before (gray line) and after (short dashed line) 75-hour aging, the circular Pt nanosheets before aging (long dashed line), and Pt black before aging (solid line).

Figure 9. Cross-section HAADF STEM images of the MEAs after 75-h fuel cell tests; (a) and (b) are the dendritic platinum nanosheets; (c) and (d) are the platinum black. Dark areas in (a) and (c) are the membrane adjacent to the platinum (light areas) of the electrode assembly.

Figure 10. Cross-section HAADF STEM images of the MEA made with platinum nanospheres after a 500-h fuel cell test at low (a) and high (b) magnification. The dark area to the right in each image is the membrane. Platinum loading was 2 mg/cm$^2$ for the MEA.

DENDRITIC METAL NANOSTRUCTURES FOR FUEL CELLS AND OTHER APPLICATIONS

CROSS-REFERENCE TO RELATED APPLICATIONS

This application is a continuation-in-part of U.S. patent application Ser. No. 10/887,535, filed Jul. 8, 2004 (now U.S. Pat. No. 7,374,599).

This application is a continuation-in-part of U.S. patent application Ser. No. 11/329,853, filed Jan. 11, 2006, which claims priority to U.S. Provisional Application No. 60/643,283 filed Jan. 12, 2005.

REFERENCE TO RELATED APPLICATION

This application claims priority to U.S. Provisional Application Ser. No. 60/788,003, filed Mar. 31, 2006, the entire content of which is incorporated herein by reference.

STATEMENT OF GOVERNMENT INTEREST

This invention was made with Government support under Contract No. CR-04-003. The U.S. Government has certain rights in this invention.

FIELD OF THE INVENTION

The invention relates to catalysts, in particular to catalysts comprising platinum or platinum-based metal materials for fuel cells, in particular polymer electrolyte membrane (PEM) fuel cells.

BACKGROUND OF THE INVENTION

Fuel cells have received much recent attention as the next-generation energy conversion technology for portable electronics, stationary power, and automotive applications. There are several types of fuel cells under investigation as classified by their operating temperature and electrolyte, including solid-oxide fuel cells, molten-carbonate fuel cells, phosphoric acid fuel cells, alkaline fuel cells, and polymer electrolyte membrane (PEM) fuel cells. The term proton-exchange membrane is also sometimes used instead of polymer electrolyte membrane, often interchangeably in the case of fuel cells using a hydrogen-based fuel.

PEM fuel cells are the leading candidates for automotive power sources due to their flexible operational conditions, ability to change power output rapidly, and their relative durability and system simplicity compared to the other types. However, there are some critical hurdles for commercializing the current technology. One of the key hurdles is the catalyst in the PEM fuel cell, which impacts on both performance and cost of the fuel cell.

In a typical polymer electrolyte membrane (PEM) fuel cell (FC), the PEM is sandwiched between two electrodes, an anode (negative electrode) and a cathode (positive electrode). The fuel cell includes a supply of fuel such as hydrogen gas to the anode, where the hydrogen is converted to hydrogen ions (protons) and electrons. Oxygen is supplied to the cathode, where the oxygen, hydrogen ions conducted through the PEM, and electrons conducted through an external circuit combine to form water. Catalysts are used to facilitate these electrode reactions. As used in a fuel cell, the catalysts may be more specifically referred to as electrocatalysts.

For better fuel cell performance, the catalyst (such as platinum) is typically in contact with an electron-conducting material such as carbon black (or other graphitic carbon) that conducts the electrons, and a proton conductor (the PEM) that conducts the protons. A typical catalyst is formed from platinum black particles on a carbon support.

The tremendous demand for platinum has greatly increased its cost. Reducing the amount of platinum used in a fuel cell would greatly aid commercialization of this technology. Furthermore, commercialization of PEM fuel cells would be helped by improved catalytic activity and durability of the catalyst under desired fuel cell operation conditions. Most research aimed at stabilizing platinum under fuel cell conditions has centered on alloying platinum with a semi- or non-precious metal such as cobalt. However, other approaches are needed.

SUMMARY OF THE INVENTION

The invention relates to catalysts comprising dendrimers, and in particular examples to catalysts comprising metal dendrimers such as platinum, or other platinum-containing metal nanostructures, for use in polymer electrolyte membrane fuel cells (PEM-FCs).

Catalysts according to the present invention include dendritic nanostructures such as metal nanosheets and metal nanospheres. The nanostructures may comprise platinum, platinum alloys such as platinum-cobalt alloys, palladium, other transition metals, and the like. By using a mixture of metal precursor compounds, alloy nanostructures can be formed, including platinum-cobalt alloy nanostructures.

Catalysts can be prepared in a mixture, such as a fluid medium, comprising a matrix, a reducing agent and a precursor compound that is reduced by the reducing agent to a catalyst material. The precursor compound may be a metal complex, such as a platinum complex. Reduction of the precursor provides nanostructures of the catalyst material, such as dendrites. The mixture may also optionally comprise a photocatalyst, and energy sources, such as light, heat, or laser radiation, may be used to seed formation of the nanostructures through formation of nanoparticles.

Dendritic nanostructures, such as platinum or platinum-containing dendritic nanosheets or nanospheres, may be formed within a fluid medium comprising a surfactant or other micelle-forming compound. As used herein, the term "micellar structure" is used very generally to include micelles, vesicles, liposomes, and the like. The term "vesicles" includes liposomes, which may be considered bilayer or multilamellar vesicles.

The term "dendritic nanostructures" includes metal dendrimers (such as dendritic nanospheres and nanosheets) prepared by methods as described herein, and other nanostructures having branched arms, which may be prepared by other methods.

A matrix, in this case comprising micellar structures within the fluid medium, facilitates dendritic growth of metal nanostructures. Such dendritic nanostructures were found to be have remarkable application as catalysts in PEM fuel cells, compared with conventional platinum black catalysts.

The nanostructures may grow directionally during the preparation in a fluid medium, through the influence of the matrix. The reducing agent may induce the reduction of, for example, metal cations to metal nanostructures with or without assistance of a photocatalyst.

Photocatalysts, or seeds acting as dendritic growth sites, may be well dispersed relative to the matrix, allowing the metal nanostructures to be well grown, particularly when compared with prior art approaches. For example, the presence of numerous, well dispersed photocatalyst-induced seeds (or otherwise introduced seeds) within a fluid medium leads to more uniformity in particle size and nanostructures. Any undesirable organic components such as the matrix or photocatalysts can be separated from the nanostructures prior to the use of catalyst in PEM fuel cells.

The matrix may comprise an organic compound, polymer, organometallic compound, metal structure (such as a sheet, mesh, nanoparticle, or the like), or other material. The matrix may provide a surface for growing the nanostructures, and also may have a special role in growing a desired structure or dimensions. For example, the matrix used for nanostructure growth may include micellar structures (such as vesicles or liposomes) within a fluid medium. The nanostructures may form on interfaces between different components of a fluid medium, such as the interface between a lamellar structure and an aqueous media, or an interface between any two fluid media. For example, generally disk-shaped nanostructured sheets were grown in a fluid medium including multilamellar liposomes, the nanostructure growth apparently being templated by the liposomes. Generally spherical nanostructures were grown in a fluid medium including unilamellar liposomes.

Dendrimer material used for dendrimer catalysts include platinum-containing metals, such as platinum metal, platinum alloys (such as platinum-cobalt alloy), other transition metals and alloys thereof, and other catalytic materials. A preferred example dendrimer material for catalyst application in hydrogen fuel cells is platinum metal.

Dendrimers may be formed as generally disk shaped nanosheets, for example having a disk thickness in the range 1-10 nm. The disk diameter may be in the range 1 nm-1000 nm, more particularly in the range 1 nm-500 nm. Dendrimers may also be generally spherical, referred to herein as nanospheres though the shape may only be approximately spherical, having a diameter in the range 1 nm-1000 nm, more particularly in the range 1 nm-500 nm, and even more particularly in the range 5 nm-100 nm. Such ranges are inclusive of the upper and lower limits, and both limits are approximate. For an approximately spherical particle, the diameter may be any measurement through the center of the particle. At least some of the metal dendrimers may have a single crystal structure. In some embodiments, the diameter or other size measurement is a median value or a distribution of sizes.

In examples of the present invention the matrix may comprise vesicles of 1,2-dioctadecanoyl-sn-glycero-3-phosphocholine (DSPC, 99%), though other surfactants, lipids, or other compounds may be used. The photocatalyst may be an organometallic compound, such as a metal porphyrin. An example photocatalyst is Sn(IV) octoethylporphyrin dichloride, though this is not limiting. The reducing agent (electron donor) may be, for example, ascorbic acid (equivalently, any ascorbate salt such as sodium ascorbate), or hydroquinone. The invention is not limited by these examples, as other matrix materials, optional photocatalyst, and/or reducing agent may be used.

The photocatalyst may be dispersed through a fluid mixture including vesicles, and the photocatalyst-coated material is combined with the reducing agent and the metal compound into the mixture. The photocatalyst may be dispersed over a surface of a solid matrix material by dissolving (or suspending) the photocatalyst and the matrix material in a common solvent, then (optionally) evaporating the solvent.

A method for making a catalyst comprises providing a mixture including a photocatalyst, a reducing agent, a metal compound, a matrix, and illuminating the mixture so as to form metal nanoparticles by reduction of the metal compound. The metal nanoparticles then act as seeds for dendritic growth of nanostructures by reduction of remaining metal compound. The matrix may be chosen to facilitate dendritic growth, such as a fluid medium including micellar structures.

Another example method for preparing a nanostructured catalyst comprises providing a mixture including a reducing agent, a metal compound, and a first matrix material, so as to form metal nanoparticles on the first matrix by reducing the metal compound. The mixture includes at least one metal compound, such as a platinum compound, cobalt compound, or combination thereof. A mixture of metal compounds may be used to form alloy particles, including platinum alloy particles such as cobalt-platinum alloy particles. The metal nanoparticles may have a median diameter of less than 100 nm, such as between 1 and 10 nm. The metal nanoparticles may be formed on the first matrix material, which may be an electron conducting material, such as carbon particles. Dendritic growth, for example using a second fluid matrix, electrolysis, or any other approach, may then be used to grow dendritic nanostructures, using the nanoparticles as seeds, and possibly supported on the first matrix material.

Catalysts according to the present invention include platinum-containing dendrimers such as platinum alloy dendrimers, including platinum-cobalt alloys and the like. Alloying with, for example, other transition metals allows reduction of the amount of platinum required.

In any approach, the matrix material and other unwanted chemical compounds can be removed before the use as catalyst. Illumination may include exposure to visible and/or UV light, and laser, such as dual tungsten light, and the like.

BRIEF DESCRIPTION OF THE DRAWINGS

FIGS. 9A and 9B show the dendritic platinum nanosheets and 9C and 9D show the platinum black;

DETAILED DESCRIPTION OF THE INVENTION

Figure 1:
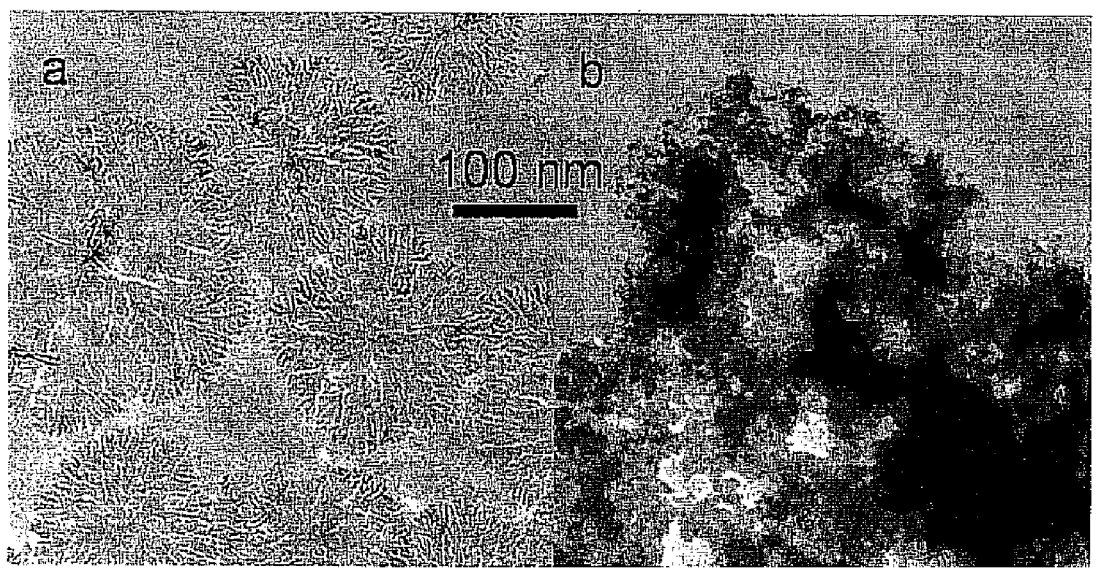
FIGS. 1A-1B show TEM images of dendritic platinum nanosheets and commercial platinum black (respectively), used for the preparation of MEAs.

The invention relates to the preparation and use of catalysts, in particular to catalysts comprising metal dendrimers. Catalyst materials include platinum, other platinum-containing materials (including platinum alloys such as platinum-cobalt alloys), palladium, other transition metals and alloys thereof, and the like. Catalyst materials may be prepared by reduction of one or more metal precursors, allowing alloy nanostructures to be formed.

Catalysts according to the present invention include dendritic nanostructures such as those including nanosheets and nanospheres. The catalysts may include structures formed by the partial fusion of smaller dendritic nanostructures.

Catalysts can be prepared in a mixture, such as a fluid medium, comprising a matrix, a reducing agent, and a precursor compound that is reduced by the reducing agent to a catalyst material. The precursor compound may be a metal complex, such as a platinum complex. Reduction of the precursor allows nanostructures of the catalyst material to be formed, such as dendritic nanostructures. A nanoscale dendritic structure has a plurality of nanoscale branched projections (or arms). The preparation mixture may also optionally comprise a photocatalyst, and energy sources, such as light, heat, or laser radiation, may be used to seed formation of the nanostructures through initial formation of nanoparticles.

The photocatalyst may be dispersed through a fluid mixture including vesicles, and the photocatalyst-coated material is combined with the reducing agent and the metal compound into the mixture. The photocatalyst may be dispersed over a matrix by dissolving (or suspending) the photocatalyst and the matrix in a common solvent, then (optionally) evaporating the solvent.

Nanostructures of catalyst material may be formed within a fluid medium comprising a micellar structure forming compound, such as a fluid including vesicles as the matrix. Micellar structures include micelles, vesicles, and/or liposomes. Vesicles may be monolayer, bilayer, or multilamellar vesicles, the latter structures being sometimes referred to as liposomes. Nanostructures may grow directionally during the preparation in a fluid medium, through the influence of the matrix. The presence of numerous, well dispersed photocatalyst-induced seeds (or otherwise introduced seeds) within a fluid medium allows greater uniformity in particle size and nanostructure. Any undesirable organic components such as the matrix or photocatalysts can be separated from the nanostructures prior to the use of catalyst in PEM fuel cells.

The matrix may comprise an organic compound, polymer, organometallic compound, metal structure (such as a sheet, mesh, nanoparticle, or the like), other material, or combination thereof. The matrix may comprise micellar structures (such as micelles, vesicles, liposomes, and the like) of an organic compound or polymer in a fluid medium. The matrix may provide a surface for growing the nanostructures, which may be the interface between two fluids, or a wall of a micellar structure, and may induce dendrimer formation. Nanostructures may form proximate to interfaces between different components of a fluid medium, such as the interface between a lamellar structure and a surrounding aqueous medium, or an interface between any two fluid media.

In examples of the present invention the matrix may comprise vesicles of 1,2-dioctadecanoyl-sn-glycero-3-phosphocholine (DSPC, 99%), though other surfactants, lipids, or other compounds may be used. The photocatalyst may be an organometallic compound, such as a metal porphyrin. An example photocatalyst is Sn(IV) octoethylporphyrin dichloride, though this is not limiting. The reducing agent (electron donor) may be, for example, ascorbic acid (equivalently, any ascorbate salt such as sodium ascorbate), or hydroquinone. The invention is not limited by these examples, as another matrix, photocatalyst, and/or reducing agent may be used.

Generally disk-shaped nanostructured sheets were grown in a fluid medium including multilamellar liposomes, the nanostructure growth apparently being templated by the liposomes. Generally spherical nanostructures were grown in a fluid medium including unilamellar liposomes.

A method for making a catalyst comprises providing a mixture including a photocatalyst, a reducing agent, a metal compound, a matrix, and illuminating the mixture so as to form metal nanoparticles by reduction of the metal compound. The metal nanoparticles then act as seeds for dendritic growth of nanostructures by reduction of remaining metal compound. The matrix may be chosen to facilitate dendritic growth, such as a fluid medium including micellar structures.

Another example method for preparing a nanostructured catalyst comprises providing a mixture including a reducing agent, a metal compound, and a matrix, so as to form metal nanoparticles on the matrix by reducing the metal compound. The preparation mixture includes at least one metal compound, such as a platinum compound, cobalt compound, palladium compound, other transition metal compound, or combination thereof. A mixture of metal compounds may be used to form alloy particles, such as platinum alloy particles. The catalyst may include or be formed from metal particles, such as dendritic nanostructures, nanoparticles, or other particles. The matrix used may be multi-component, and may include an electron conducting materials such as graphitic carbon.

In some examples, dendritic structures of a catalyst material may be grown on particles or other structures of the catalyst material or other material (such as another metal). For example, a matrix of vesicles may be used to grow dendritic nanostructures on nanoparticle seeds. Other methods of growing dendrimers may be used, such as electrolysis, or the slow cooling and/or crystallization of metal. Dendritic structures may be grown on an electron-conducting material, used as a support material.

Catalysts according to the present invention include platinum-containing dendrimers such as platinum alloy dendrimers, including platinum-cobalt alloys and the like. Alloying with, for example, other transition metals may reduce the amount of platinum required.

In any approach, the matrix material and other unwanted chemical compounds can be removed before the use as catalyst. Illumination may include exposure to visible and/or UV light, laser, dual tungsten light, and the like.

Embodiments of the present invention include catalyst applications of the platinum and platinum based metal materials synthesized through processes involving chemical and/or photocatalytic reduction.

The activity and durability of a platinum catalyst were improved by manipulation of the physical form of the platinum. Traditional platinum catalysts, both unsupported and supported on conducting substrates such as carbon, are typically in the form of 2 to 10 nm nanoparticles. These particles are thermodynamically unstable and prone to dissolution, sintering, and agglomeration. An approach was developed to create extended platinum nanostructures with high surface area, stability and activity, which are not as prone to dissolution and structural reorganization under fuel cell conditions. The new forms of platinum catalysts gave excellent results in fuel cell conditions.

Platinum nanosheets were grown on unilamellar liposomes and multilayer vesicles as nearly circular flat sheets. Platinum nanospheres of convoluted interconnected sheets were also grown, which conformed to the surfaces of aggregated liposomes. Experimental results indicated that the platinum dendritic sheets have much higher catalytic activity and durability than the traditional platinum catalyst under PEM fuel cell conditions.

The performance characteristics of membrane electrode assemblies prepared using the circular flat nanosheets and from foam-like nanospheres were measured and compared to commercially available platinum black in terms of electroactive surface areas, fuel cell polarization curve performance, and durability under fuel cell conditions.

Nanostructured platinum catalysts were found to have slightly lower initial polarization curve performance than the platinum black, but their durability during fuel cell operation was significantly enhanced over the commercially available material. During a 75 hour potentiostatic life test at 0.5 V, the performance of the platinum black declined 47%, while the performance of the platinum sheets declined only 33%. More importantly, the performance of the platinum foam-like nanospheres in the durability test improved slightly over this same time frame. The differences in performance can be attributed to changes in electrochemically active surface area as the catalysts aged. Electron microscopy and X-ray diffraction spectra verified that the improved durability arises from the novel dendritic structure of the platinum nanosheets and foam-like nanospheres.

Song et al., (J. Am. Chem. Soc. 2004, 126, 635-645), incorporated herein by reference, describes methods of preparing platinum nanostructures, such as dendritic nanostructures composed of dendritic sheets that are 2 nm thick with approximately 3 nm wide arms and arm spacing of 1 to 2 nm. These may be used in embodiments of the present invention.

Nanostructures for use in fuel cells according to the present invention may be prepared by reduction of a metal compound, such as a metal salt, in a fluid medium, such as an aqueous medium. The presence of large unilamellar liposomes in the fluid medium, along with the metal compound allows dendritic nanostructured sheets to be prepared. Seeding with platinum nanoparticles, such as particles in the 1-5 nm diameter range, allows nanodendrites of more uniform diameter to be obtained. Alternatively, in-situ seeding can be used, for example by photocatalytic formation of metal nanoparticles.

Example 1

Dendritic Platinum Nanosheets

Multilamellar liposomes (vesicles) were prepared by adding DSPC (1,2-dioctadecanoyl-sn-glycero-3-phosphocholine) (79 mg) to 100 mL of ascorbic acid solution (150 mM) followed by mild sonication for 2 minutes using an ultrasonic cleaner FS14H (Pittsburgh, Pa.). The procedure gives a final DSPC concentration of 1 mM. The average diameter of the vesicles was 400 nm as determined by dynamic light scattering using a Beckman Coulter N5 submicron particle size analyzer. Circular dendritic platinum nanosheets with diameters of 30-500 nm were prepared using the multilamellar DSPC vesicles in ascorbic acid solution (150 mM) as templates. To prepare the dendritic nanosheets, 100 mL of a suspension of the multilamellar DSPC liposomes (1 mM DSPC) in ascorbic acid (150 mM) was mixed with 100 mL of the aged platinum complex (20 mM) in a glass reaction vessel. The reaction mixture was left under ambient conditions for at least 100 minutes to insure that Pt reduction was complete before samples were taken for imaging by electron microscopy.

FIGS. 1A-1B show typical TEM images of the dendritic platinum nanosheets and commercial platinum black, respectively. The circular platinum nanosheets (FIG. 1A) were determined to be 2 nm thick and up to 500 nm in diameter. They are typically single crystals or polycrystalline with only a few large domains with nearly the same crystallographic orientation separated by small angle grain boundaries. There is also usually some minor bending in the atomic fringes observed in the TEM images. FIG. 1B shows the platinum black used for comparison purposes, composed of 5-6 nm particles.

Example 2

Dendritic Platinum Nanospheres

Unilamellar liposomes were prepared via an extrusion process. Briefly, 50 mL of the 1.0 mM DSPC and the 1.0-mM cholesterol stock solutions were mixed in a glass tube; lipid films formed on the glass wall after evaporating the chloroform under vacuum. After drying overnight, 100 mL of Nanopure water was added, and the mixture was heated for 1 hour at 65° C. in a water bath. The sample was then vortexed to facilitate the formation of multilamellar vesicles. Finally, the mixture was extruded through a 200 nm porous polycarbonate filter, and the extrusion process was repeated a total of 10 times. The average diameter of the unilamellar liposomes measured by dynamic light scattering was 140-170 nm. Foam-like platinum nanospheres were synthesized by adding 100 mL of the suspension of the unilamellar liposomes prepared in water to a glass reaction vessel, followed by the addition of 100 mL of aged platinum complex (20 mM) and 2.64 g of solid ascorbic acid. Immediately after mixing, the cloudy liposome suspension appears to flocculate. The reaction mixture was swirled to fully dissolve the ascorbic acid and left under ambient conditions for at least 100 minutes before samples were taken for imaging.

Figure 2:
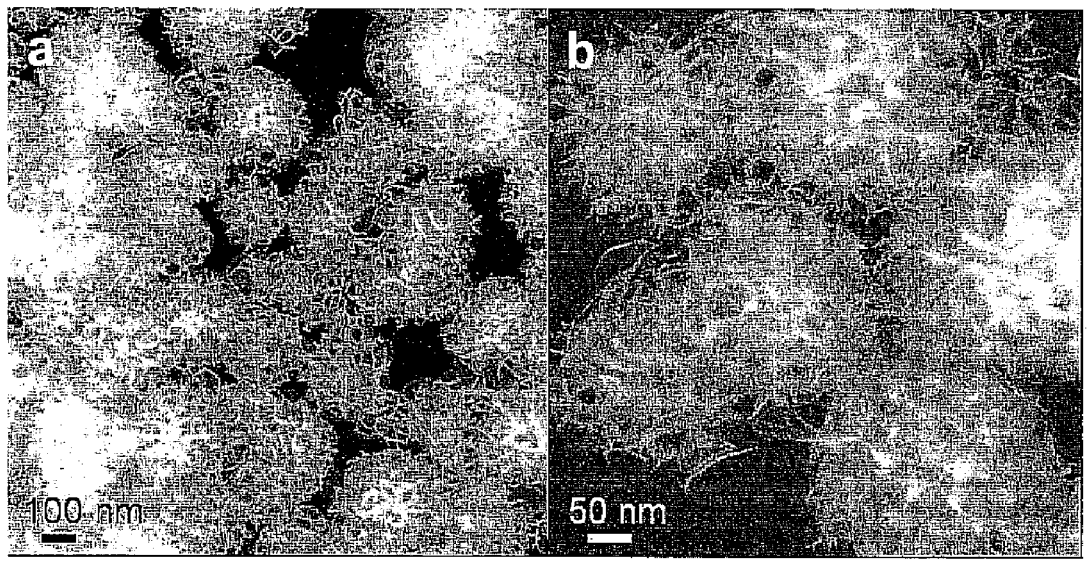
FIGS. 2A-2B show HAADF STEM images of dendritic platinum foam-like nanospheres used in preparation of the MEA.

FIGS. 2A-2B shows HAADF STEM images of dendritic foam-like platinum nanospheres, which were used in preparation of a MEA. These remarkable nanostructures were synthesized by templating the growth of the platinum dendritic sheets on aggregated unilamellar liposomes; the platinum dendritic sheets conform to the spherical shapes of the liposomes. They were formed by initiating a seed particle within the liposomes, and the particle then grows isotropically by oxidation of ascorbic acid along the bilayers of the liposomes until the platinum complex is exhausted.

Seeding may be achieved by addition of nanoparticles, or in-situ growth of nanoparticles. Tin(IV) porphyrin may be used for in-situ photocatalytic reduction of platinum complexes to nanoparticles. Increasing the number of seeds, for example by reducing the platinum to porphyrin molar ratio or increasing illumination time, reduces the mean diameter of the nanospheres produced. Diameters were controlled experimentally from approximately 5 nm to approximately 100 nm. For fuel cell applications, a diameter range of approximately 1 nm to approximately 500 nm may be used.

Nanospheres may also be prepared using reduction of metal compounds (such as platinum complexes) in aqueous micellar solutions formed by surfactants. Surfactants which may be used include sodium dodecylsulfate (SDS) and polyoxyethylene(23) laurylether (Brij-35), though others may also be used. Electron donors (reducing agents) other than ascorbic acid may also be used. Without seeding, the nanosphere diameters have a wider range of diameters, for example between 5 and 100 nm, but such materials may also be used as catalysts.

Example 3

PEM Fuel Cell Performance of Dendritic Platinum Nanosheets

The dendritic platinum nanosheets were purified by batch processing of 50 mL quantities of the reaction mixture. The batches were initially centrifuged at 3500 RPM for at least 5 minutes using an EC Centra®MP4R Centrifuge (Golden, Colo.). The supernatant was then removed, certain amount of distillated water added to the black precipitate, and the material re-suspended by mild sonication for 30 minutes. The centrifugation/re-suspension procedure was repeated five additional times to remove as much surfactant, salts and other impurities as possible. The resulting black slurry was then dried in an oven for 12 hours at 75° C. prior to being used in the surface-area and electrocatalysis studies.

All fuel cell experiments were conducted utilizing 5 cm$^2$ cell hardware and a fuel cell test station from Fuel Cell Technologies (Albuquerque, N. Mex.). The flow fields used were single-channel serpentine in a co-flow anode and cathode pattern. Tests were performed at a cell temperature of 80° C. Gases were fed at constant flow rates of 200 standard cm$^3$/min $H_2$ for the anode and 500 standard cm$^3$/min air for the cathode with dewpoints of 80° C. The outlet pressure of both anode and cathode was held at 20 psig. The MEAs were made in-house utilizing Nafion 112 membranes with standard thin film electrodes with loadings of 7 mg Pt/cm$^2$ or 2 mg Pt/cm$^2$ as noted. Both anode and cathode catalyst layers were identical, and the Nafion loading was 10 weight % in each case. HiSPEC 1000 (Johnson-Matthey) was the commercial platinum black catalyst utilized and the gas diffusion layers used were carbon paper with integral microporous layers (250 µm). All MEAs were broken in under 0.5 V potentiostatic hold at the above conditions for at least 3.5 hours before recording the data presented in this report.

Figure 3:
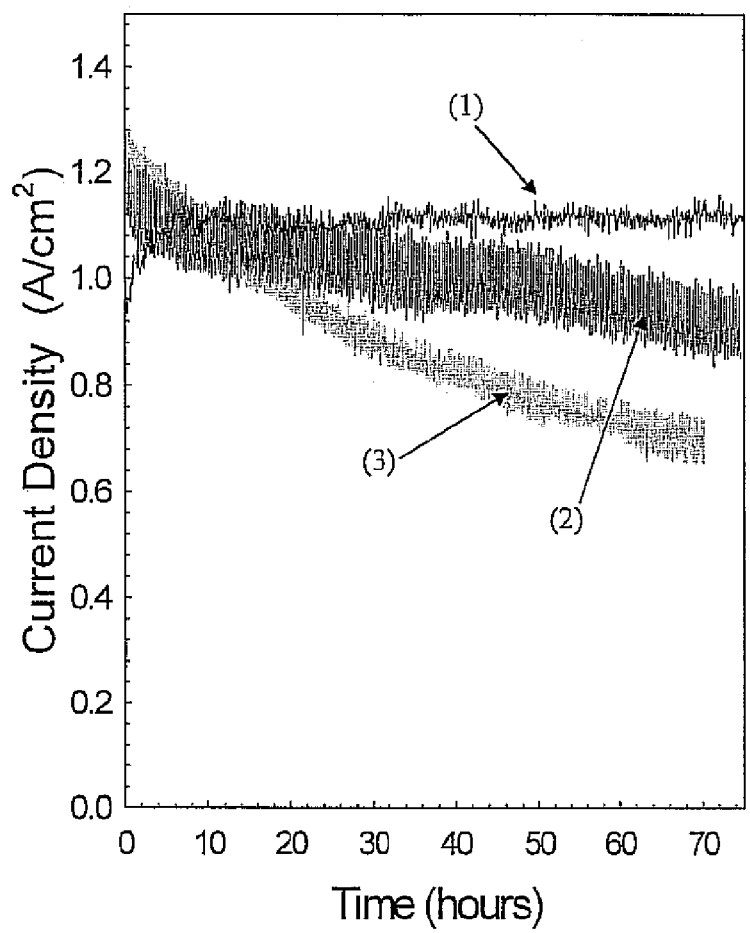
FIG. 3 shows short-term durability tests at 0.5 V potentiostatic hold for 7 mg Pt/cm$^2$ loadings for dendritic nanospheres (curve 1), nanosheets (curve 2) and platinum black (curve 3)

FIG. 3 shows lifetime curves for current density for MEAs made of the dendritic Pt nanospheres (curve 1), nanosheets (curve 2) and platinum black (curve 3) with 7 mg Pt/cm$^2$ loadings, during a 75 hour potentiostatic durability test using a 0.5V potentiostatic hold. Though the MEA using Pt nanospheres has lowest current density in the beginning 8 hours, the catalyst shows the highest stability. The initial low current density with the Pt nanospheres suggests the necessity of pretreatment under fuel cell conditions. On the other hand, the platinum nanosheets (curve 2) have a slightly lower current density than the MEA made with platinum black at the initiation of the life test. More importantly, the decline during 75 hours run was only 19% (1.2 A/cm$^2$ to 0.97 A/cm$^2$) compared with 43% for the platinum black MEA (1.25 A/cm$^2$ to 0.71 A/cm$^2$). At the termination of the life test, the platinum nanosheets maintained a higher current density than the platinum black MEA. The performances of the nanostructures are very promising results for this approach to durable platinum fuel cell catalysts. In other words, the results implies the catalytic activity and durability of platinum may be improved by manipulating its physical form.

Figure 4:
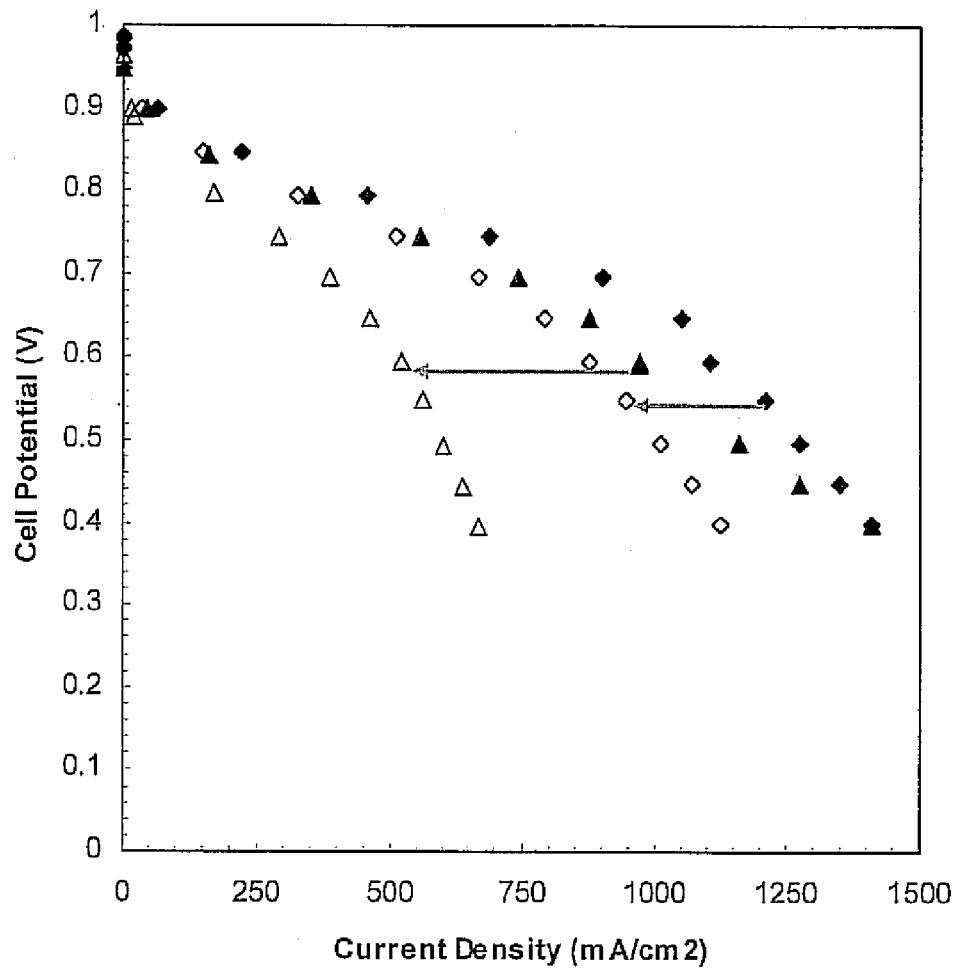
FIG. 4 shows polarization curves before and after 75 hour potentiostatic tests on MEAs prepared with Pt nanosheets at time 0 (♦) and 75 h (◊) and with Pt black at time 0 (▲) and 75 h (△) for loadings of 7 mg/cm$^2$.

FIG. 4 shows polarization curves before and after 75 h potentiostatic tests on MEAs prepared with Pt nanosheets at time zero (filled diamonds) and 75 h (unfilled diamonds), and with Pt black at time zero (filled triangles) and 75 h (unfilled triangles), for loadings of 7 mg/cm$^2$. The change in performance over 75 hours is quite noticeable in polarization curves that were taken at the beginning and end of the test. In FIG. 4, the initial polarization curves at time zero are nearly equivalent, but at 75 hours the polarization curve for the platinum black is much lower than for the platinum nanosheets. Degradation occurs in each case over this short durability test, partially due to the unsupported nature of the catalysts (there was no carbon black support for the catalysts).

Example 4

PEM Fuel Cell Performance of Dendritic Platinum Nanospheres

Pretreatment to the Pt sample and fuel cell experimental details are same as described in Example 3. The dendritic foam-like platinum nanospheres shown in the TEM images of FIG. 2 were investigated as fuel cell catalyst.

Figure 5:
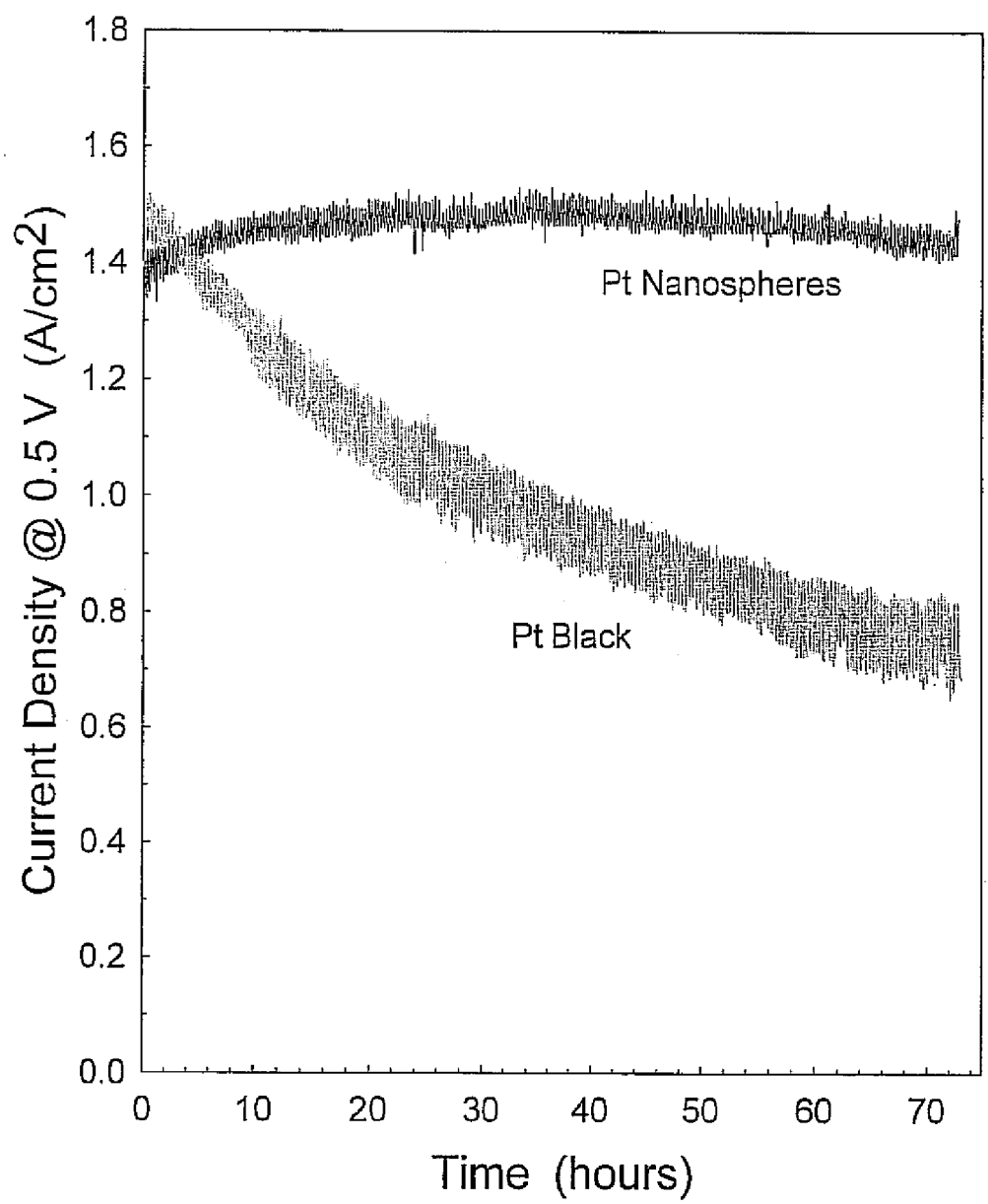
FIG. 5 shows short-term durability tests at 0.5 V potentiostatic hold for MEAs made with Pt nanospheres and Pt black.

FIG. 5 illustrates short term durability tests at 0.5 potentiostatic hold for MEAs made with Pt nanospheres and Pt black. At the low platinum loading (2 mg Pt/cm$^2$), these novel platinum nanospheres show excellent stability over a 75-hour potentiostatic test at 0.5 V. The initial performance of the MEA made with the dendritic platinum nanospheres was lower than that with platinum black, but the degradation of these two forms of platinum was not as severe during the course of the 75-hour test. The improvement using Pt nanospheres, over the conventional use of Pt black, is truly remarkable.

Example 5

Investigation of the Platinum Nanostructures

Cyclic voltammetry (CV) data was acquired in the fuel cell test hardware using a PAR 273A potentiostat. The CV experiments were conducted at 25° C. with hydrogen and nitrogen at 100% relative humidity fed to the anode and cathode, respectively. The anode served as a dynamic hydrogen reference electrode (DHE) and the cathode served as the working electrode. The potential of the cathode was scanned from 0.1 V to 1.0 V versus DHE at 50 mV/s to acquire the CV curves. Three CV scans were taken consecutively and the third curve was used for analysis. The CV curves were integrated to determine the ECA of the platinum according to the procedure of Schmidt et al. (J. Electrochem. Soc. 1996, 145, 2354-2358).

Figure 6:
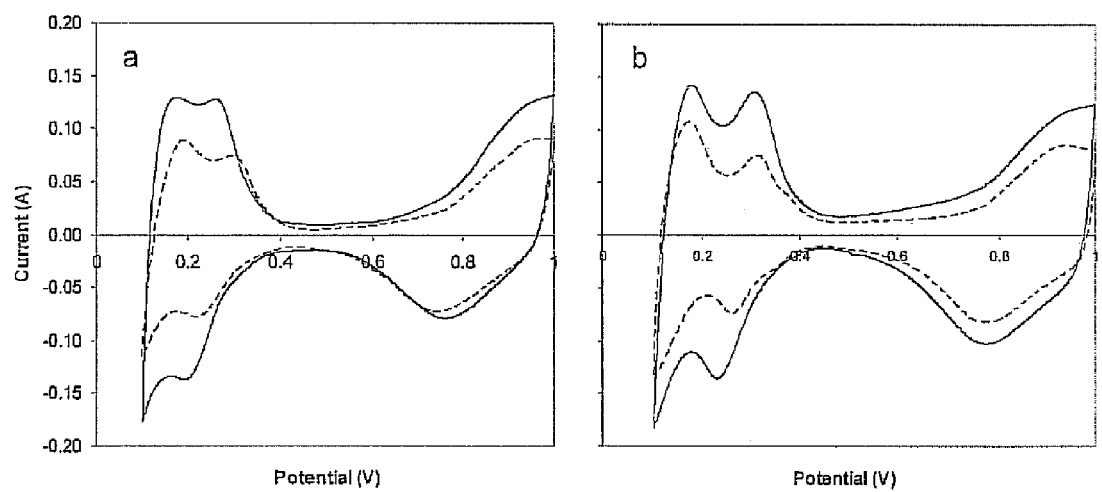
FIGS. 6A-6B shows cyclic voltammagrams for Pt black and Pt nanosheets, respectively, where solid curves are at time 0 and the dashed curves are at 75 h.

FIGS. 6A-6B show the initial (0 h) and final (75 h) cyclic voltammograms (CVs) for the platinum nano sheets (FIG. 6A) and the platinum black (FIG. 6B). The solid curves are at time zero and the dashed curves are at 75 h. A drop in ECA from 6.4 m2 Pt/g Pt to 4.1 m2 Pt/g Pt is calculated from the CV curves for the platinum nanosheets in FIG. 6b. By comparison, the ECA of the platinum black declined from 5.9 m2/g Pt to 3.4 m2 Pt/g Pt as calculated from the CV curves in FIG. 6A. Wile the percentage drop in ECA for each sample during the test is only slightly larger for the platinum black (41%) than for the platinum nanosheets (36%), the ECAs at the end of the 75 hour test are significantly different, which must give rise to the higher current density observed for the nanosheets. The change of ECAs is thus consistent with both the durability performance and electron microscopy data.

Figure 7:
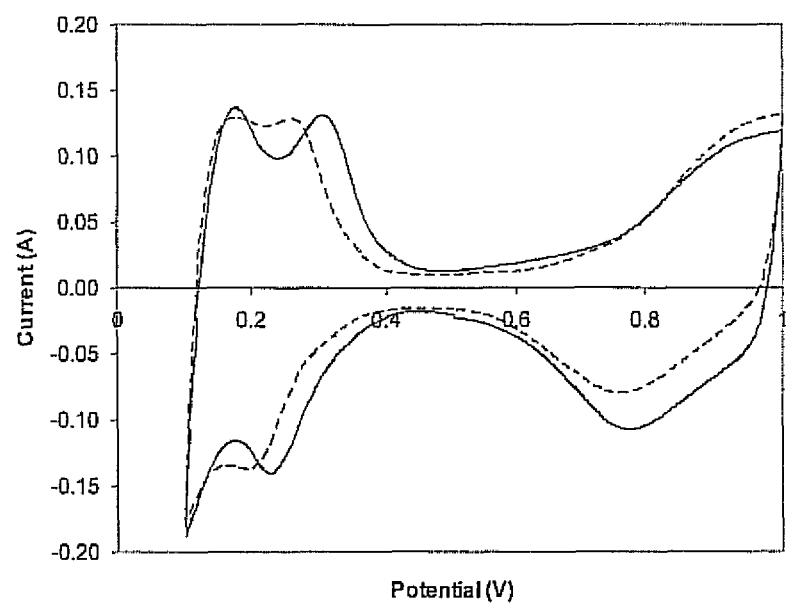
FIG. 7 shows a comparison of CV features for Pt sheets (solid line) and Pt black (dashed line) before fuel cell test.

FIG. 7 shows a comparison of CV features for Pt nanosheets (solid line) and Pt black (dashed line) before fuel cell testing. There is evidence that the platinum sheets show more characteristics of "bulk-like" platinum than does the platinum black catalyst. In particular, the features of the initial CV curve below 0.4 V versus DHE are much more distinct for the platinum nanosheets, which is indicative of a polycrystalline platinum material. This interesting characteristic could also partially explain the increased stability of the platinum nanosheets and might indicate that the platinum nanosheets possess greater intrinsic electrocatalytic activity than the platinum black.

Figure 8:
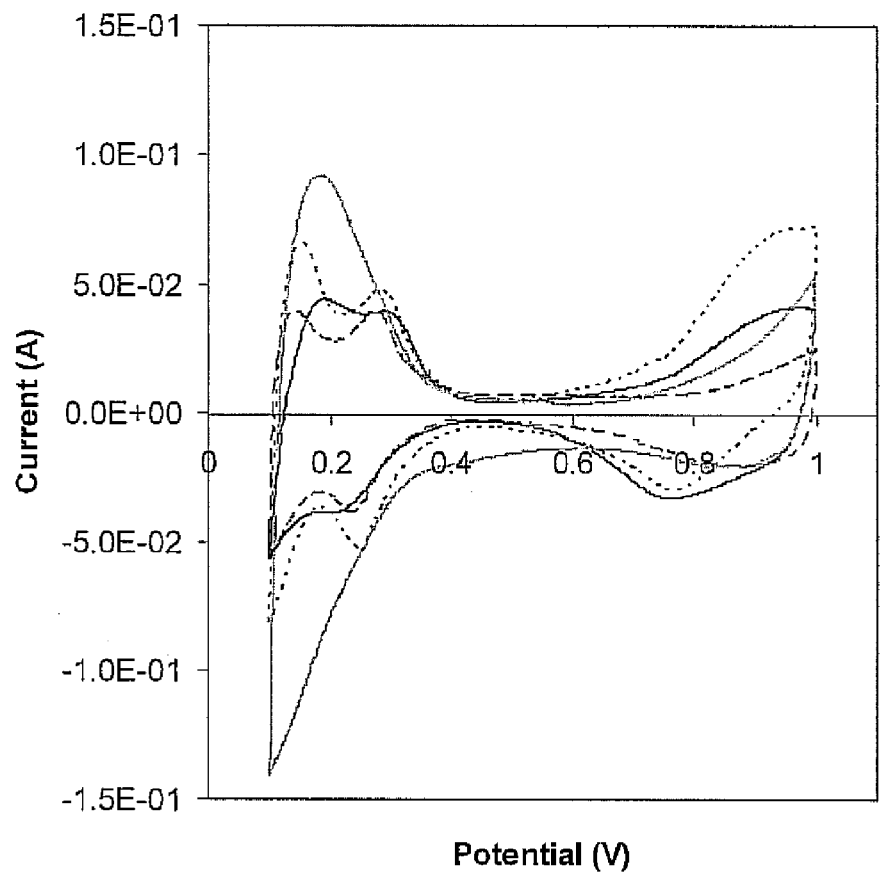
FIG. 8 shows cyclic voltammagrams for the 2 mg Pt/cm$^2$ MEAs for the Pt nanospheres before (gray line) and after (short dashed line) 75-hour aging, the circular Pt nanosheets before aging (long dashed line), and Pt black before aging (solid line)

FIG. 8 shows the initial CV curves obtained for the 2 mg Pt/cm$^2$ MEAs for the Pt nanospheres before (gray line) and after (short dashed line) 75 h aging, and the circular Pt nanosheets before aging (long dashed line), and Pt black before aging (solid line). In the course of MEA testing, the break in and initial performance of the Pt nanospheres was found to differ greatly from the nanosheets and Pt black. The first measurement of ECA on the Pt nanospheres yielded virtually no resolved hydrogen absorption/desorption features below 0.4 V versus DHE (gray line). After the 75 hour potentiostatic test (short dashed line), the CV showed the expected, well-defined platinum features, and the ECA was still very high, 9.0 m2 Pt/g Pt. This value for the ECA is even greater than for the MEAs of the other two nanomaterials before aging (solid and long dashed lines). The extremely high ECA of the foam-like Pt nanospheres may indicate promise for creating exceptionally high current density electrodes if the three-dimensional structure of the electrode can be optimized to take full advantage of this nanostructured platinum catalyst.

High-angle annular dark-field (HAADF) scanning TEM (200 keV JEOL 2010F) was used to study the MEA cross-sections after fuel cell test. Epo-fix embedding resin A (1232-R) and B (1232-H), obtained from Electron Microscopy Sciences (Hatfield, Pa.), were mixed together in a volume ratio of 15:2 and transferred to a polyethylene conical-bottom capsule (EMS, Hatfield, Pa.) with a 1×1 mm face at the tip. Small pieces of the fresh and aged MEAs without the backing carbon gas diffusion layer (GDL) papers were cut and added to the resin mixture in the capsules. The capsules were then cured in an oven at 70° C. for 8 hours, allowing the partially cut MEA samples to precipitate to the conical bottom and the resin to solidify. The plastic capsules were peeled off and the solidified resin tip containing the MEA samples was trimmed. An ultramicrotome instrument (MT XL, RMC Products, Tucson, Ariz.) installed with a diamond knife (Dupont, Carson City, Nev.) was used at a cutting speed of 4 mm/s to produce 50 nm thick slices of the solid resin containing the partially cut MEA samples. The slices were collected on a standard holey carbon-coated copper TEM grid for imaging.

Figure 9:
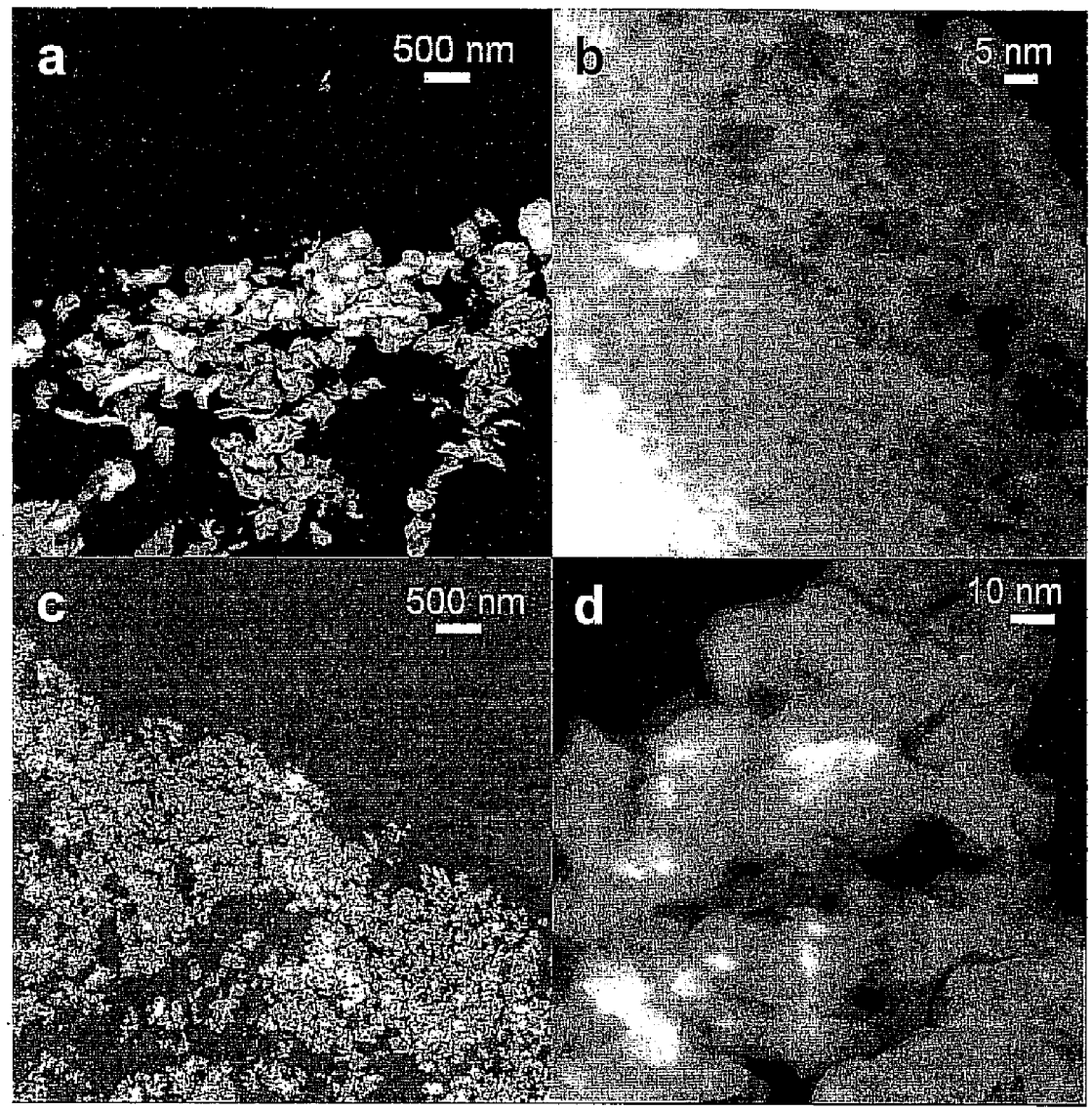
FIGS. 9A-9D shows cross-section HAADF STEM images of the MEAs after a 75 h fuel cell tests, where

FIGS. 9A-9D show cross-section HAADF STEM images of the MEAs after 75 h fuel cell tests, which confirmed that the platinum nanosheets and the platinum black sintered during the short-term test. The original 5-6 nm particles in the platinum black grew into larger particles mostly ranging from 10 to 30 nm in diameter (FIGS. 9C and 9D). In contrast, the MEA made with dendritic platinum nanosheets retained the sheet-like morphology (FIG. 9A) but sintered to form many 2-5 nm pores through the nanosheets (FIG. 9B) by partially filling in the spaces between the arms of the dendrites. The dark areas in FIGS. 9A and 9C are the membrane adjacent to the platinum (light areas) of the MEA.

Hence, an improved catalyst for fuel cell applications comprises a porous sheet having a plurality of pores therethrough, the pores having a pore diameter in the approximate range 1 nm-10 nm, more particularly in the range 2 nm-5 nm. The porous sheet may comprise a plurality of dendritic nanostructures, and may comprise partially fused (e.g. sintered) metal dendrimers.

Figure 10:
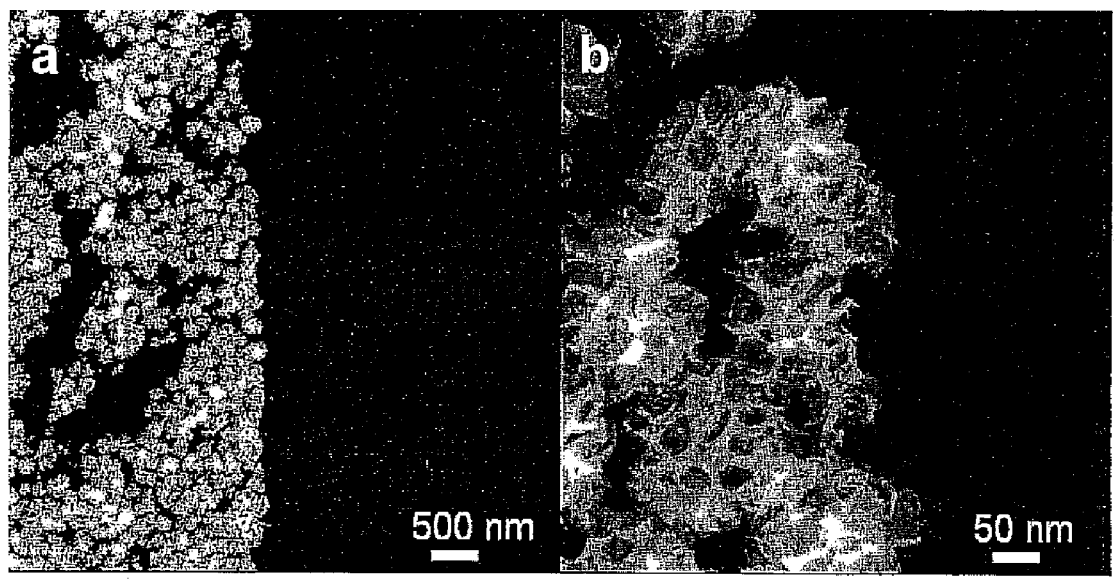
FIG. 10 shows cross-section HAADF STEM images of the MEA made with platinum nanospheres after a 500 h fuel cell test.

FIGS. 10A-10B shows STEM images of cross sections of the MEA made with the platinum nanospheres at low and high magnification. The dark area to the right in each image is the membrane, and platinum loading was 2 mg/cm$^2$ for the MEA. These images were obtained after a 500 hour aging period. By comparison with the images in FIG. 2, it is clear that the gross features of the platinum nanospheres have not changed during the 500 h test. However, it is still possible that some fusing of the arms of the dendrites has occurred similar to that observed for the MEA made from the Pt nanosheets (FIG. 9B).

Further Preparation Details: Dendritic Platinum Nanosheets

Potassium tetrachloroplatinate ($K_2PtCl_4$; 99.99%), L-ascorbic acid (AA) (99+%), 1,2-dioctadecanoyl-sn-glycero-3-phosphocholine (DSPC, 99%), and cholesterol (99+%) were of the highest purity available and were used as received from Sigma-Aldrich (St. Louis, Mo.). All aqueous solutions Were prepared with ultrapure water from a Barnstead Nanopure water system (Chesterland, Ohio).

A stock solution of the platinum(II) complex (20 mM) was prepared by dissolving $K_2PtCl_4$ in water and allowed to age for at least 24 h before use. Aging results in disproportionation of the complex into an equilibrium mixture of 42% $Pt(H_2O)_2Cl_2$, 53% $Pt(H_2O)Cl_3^-$ and 5% $PtCl_4$. An ascorbic acid stock solution (150 mM) was freshly prepared before each reaction because it gradually oxidizes in air.

Multilamellar liposomes (vesicles) were prepared by adding DSPC (1,2-dioctadecanoyl-sn-glycero-3-phosphocholine) (79 mg) to 100 mL of ascorbic acid solution (150 mM) followed by mild sonication for 2 minutes using an ultrasonic cleaner FS14H (Pittsburgh, Pa.) at room temperature. The procedure gives a final DSPC concentration of 1 mM. The average diameter of the vesicles was 400 nm as determined by dynamic light scattering using a Beckman Coulter N5 submicron particle size analyzer.

Circular dendritic platinum nanosheets with diameters of 30-500 nm were prepared using the multilamellar DSPC vesicles in ascorbic acid solution (150 mM) as templates. To prepare the dendritic nanosheets, 100 mL of a suspension of the multilamellar DSPC liposomes (1 mM DSPC) in ascorbic acid (150 mM) was mixed with 100 mL of the aged platinum complex (20 mM) in a glass reaction vessel. The reaction mixture was left under ambient conditions for at least 100 minutes to insure that Pt reduction was complete before samples were taken for imaging by electron microscopy.

Further Preparation Details: Dendritic Platinum Nanospheres

Potassium tetrachloroplatinate ($K_2PtCl_4$; 99.99%), L-ascorbic acid (AA) (99+%), 1,2-dioctadecanoyl-sn-glycero-3-phosphocholine (DSPC, 99%), and cholesterol (99+%) were of the highest purity available and were used as received from Sigma-Aldrich (St. Louis, Mo.). All aqueous solutions were prepared with ultrapure water from a Barnstead Nanopure water system (Chesterland, Ohio).

A stock solution of the platinum(II) complex (20 mM) was prepared by dissolving K2PtCl4 in water and allowed to age for at least 24 h before use. Aging results in disproportionation of the complex into an equilibrium mixture of 42% $Pt(H_2O)_2Cl_2$, 53% $Pt(H_2O)Cl_3^-$ and 5% $PtCl_4$.

An ascorbic acid stock solution (150 mM) was freshly prepared before each reaction because it gradually oxidizes in air. To prepare the unilamellar liposomes, 50 mL of the 1.0-mM DSPC and the 1.0 mM cholesterol stock solutions were mixed in a glass tube; lipid films formed on the glass wall after evaporating the chloroform under vacuum. After drying overnight, 100 mL of Nanopure water was added, and the mixture was heated for 1 hour at 65° C. in a water bath. The sample was then vortexed to facilitate the formation of multilamellar vesicles. Finally, the mixture was extruded through a 200 nm porous polycarbonate filter, and the extrusion process was repeated a total of 10 times. The average diameter of the unilamellar liposomes measured by dynamic light scattering was 140-170 nm.

Foam-like platinum nanospheres were synthesized by adding 100 mL of the suspension of the unilamellar liposomes prepared in water to a glass reaction vessel, followed by the addition of 100 mL of aged platinum complex (20 mM) and 2.64 g of solid ascorbic acid. Immediately after mixing, the cloudy liposome suspension appears to flocculate. The reaction mixture was swirled to fully dissolve the ascorbic acid and left under ambient conditions for at least 100 minutes before samples were taken for imaging.

Nanostructures may be fabricated using one or more metals, and may comprise platinum, a platinum alloy (such as platinum-cobalt, platinum-ruthenium, or other alloy), or other catalyst material such as a transition metal or alloy thereof.

Fuel Cell Applications

In a hydrogen fuel cell, hydrogen is converted into protons and electrons at the anode, and water is formed from protons, electrons, and oxygen at the cathode. The electrodes include an electron-conducting material, such as a carbon-based material, such as graphite, and the catalyst may be supported on the electron-conducting material. For example, the catalyst layer may be located between a roughened surface of an electrically-conducting sheet (such as a graphite sheet, carbon cloth, or similar) and the electrolyte. In other examples, the electrode may include both an electron-conducting material and a proton-conducting material, the catalyst preferably being proximate to both the electron conducting material and the proton-conducting material. At the anode, the catalyst assists conversion of hydrogen into protons and electrons, and at the cathode the catalyst assists the formation of water. The catalyst used for anode and cathode may be the same, for each electrode may include catalyst dendrimers, such as dendrimers of platinum or a platinum alloy. However, embodiments of the present invention include fuel cells in which different catalysts, and hence dendrimer materials, are used in the anode and the cathode.

A membrane electrode assembly (MEA) for a PEM fuel cell comprises the negative electrode (anode), positive electrode (cathode), and a polymer electrolyte membrane (PEM) located between the anode and the cathode. The electrodes each include a catalyst, for example in a catalyst layer proximate to the membrane electrolyte. An electrode may have gas diffusion layer as a backing (on the opposite side from the membrane electrode), for example comprising an electrically-conducting material such as a carbon cloth. Each electrode may have an associated electron collector.

Hence, an improved electrode for a fuel cell comprises dendritic nanostructures of a catalytically active material, such as platinum.

Figure 11:
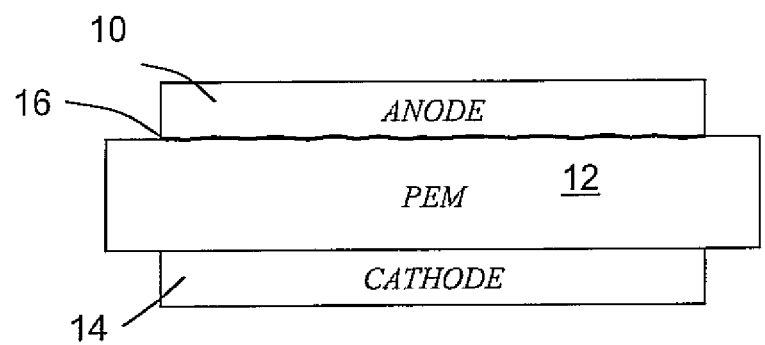
FIG. 11 illustrates a MEA using a catalyst according to an embodiment of the present invention.

FIG. 11 illustrates an MEA configuration, comprising anode 10, PEM 12, cathode 14, and catalyst layer 16 disposed proximate to the interface between the anode and the PEM. The catalyst layer includes metal dendritic nanostructures. Alternatively, or additionally, a catalyst layer proximate to the cathode-PEM interface may include a catalyst layer comprising metal dendritic nanostructures.

Hence, a fuel cell according to an embodiment of the present invention comprises a first electrode, a second electrode, and a polymer electrolyte membrane (PEM) located between the first electrode and the second electrode, wherein the first electrode includes an electron-conducting material and a catalyst, the catalyst comprising dendritic structures, for example comprising metal dendrimers having multiply-branched arms.

The dendrimers comprise a dendrimer material selected for catalytic activity during operation of the fuel cell. For a hydrogen fuel cell, catalytic activity includes dissociation of hydrogen into protons and electrons at the anode, or the generation of water from oxygen, protons, and electrons at the cathode. The first electrode may be the anode or the cathode. Both the anode and the cathode may include dendrimers, and the dendrimer material in the two electrodes may be the same or different. In a fuel cell or MEA, one (anode or cathode) or both (anode and cathode) electrodes may include dendrimers as described herein. For example, the first electrode may include dendrimers formed from a first dendrimer material, and the second electrode may include dendrimers formed from a second dendrimer material. The first and second dendrimer materials may be the same or different. The dendrimers may have been prepared in a fluid medium, dendrimer growth being templated by structures, such as vesicles, within the fluid medium. As is known in the art, fuel cells also comprise fuel delivery systems. The fuel delivered to the anode may be hydrogen or any other hydrogen-containing material such as methanol. Oxygen or other oxygen-containing gas, such as air, may be delivered to the cathode. Catalysts according to the present invention may also be used with solid-oxide fuel cells, molten-carbonate fuel cells, phosphoric acid fuel cells, and other electrochemical devices, such as fuel cells using cations other than protons (such as alkaline fuel cells).

Dendritic nanostructures may be fabricated using one or more metals, and may comprise platinum, a platinum alloy (such as platinum-cobalt, platinum-ruthenium, or other alloy), or other catalyst material such as a transition metal or alloy thereof. A method of preparing an electrode for a fuel cell comprises preparing dendritic nanostructures, and distributing the dendritic nanostructures over an electron conducting material.

Membrane-Electrode Assemblies

A membrane-electrode assembly (MEA) according to the present invention comprises a first electrode, a second electrode, an ion-conducting membrane between the first electrode and the second electrode, the first electrode including dendrimers, the dendrimers providing catalytic activity during operation of the membrane-electrode assembly.

The membrane of a PEM hydrogen fuel cell comprises a proton-conducting polymer membrane that preferably has poor electron conductivity. Numerous proton-conducting membranes are known in the art, such as NAFION-based membranes, which may be used in embodiments of the present invention. Fuel cells according to the present invention may also include non-PEM fuel cells, such as other solid electrolyte fuel cells, and liquid electrolyte fuel cells. Absent other processes, the improved stability of the catalysts is applicable to other types of fuel cell.

In some examples, the electron-conducting material may be similar to the catalyst material, for example dendrimers formed on a metal sheet or mesh.

Catalyst Composition

Catalyst material used for dendrimer catalysts may include platinum-containing metals, such as platinum metal, platinum alloys (such as a platinum-cobalt alloy, or an alloy of Pt with one or more of Sn, Fe, Co, Cr, Ni, Nb, V, Mo, Mn, Pd, Ru, Zr, Ir, Rh, and V), other transition metals and alloys thereof, other metals, and other catalytically active materials. A preferred example dendrimer material for hydrogen fuel cells is platinum or platinum alloy. Other metals may be used, for example nickel-cobalt alloys. The catalyst may comprise one or more metals selected from the group of metals: Pt, Sn, Fe, Co, Cr, Ni, Nb, V, Mo, Mn, Pd, Ru, Zr, Ir, Rh, and V, for example as an alloy. Catalysts may include any catalytically-active materials. In representative preferred examples, metal particles may include alloys of platinum and at least one metal from the group consisting of Fe, Co, Pd, and Ni.

The enhanced stability of the catalyst appears to be related to the physical form, implying that other metal dendrimer catalysts will show similar improvements over conventional nanoparticulate catalysts.

In some examples, the electron-conducting material may be similar to the catalyst material, for example dendrimers formed on a metal sheet or mesh.

Dendrimer Forms

Dendrimers may be formed as generally disk shaped, for example having a disk thickness in the range 1-50 nm, more particularly in the range 1-10 nm. The disk diameter is greater than the disk thickness, and may be generally in the range 1 nm-1000 nm, particularly in the range 1 nm-500 nm, and more particularly in the range 30 nm-500 nm. Dendrimers may be generally spherical, with a diameter in the range 1 nm-1000 nm, more particularly in the range 1 nm-500 nm. In examples of the present invention, at least some of the metal dendrimers may have a single crystal structure.

Further Discussion of Preparation Approaches

A catalyst may be prepared by providing a mixture including a metal precursor, a reducing agent, a photocatalyst, and a matrix material. On illuminating the mixture, nanostructured catalyst materials are formed by reduction of the metal precursor. The photocatalyst may be dispersed on (or through) the matrix material before combination with the metal precursor and reducing agent, and hence prior to reduction of the metal precursor to the catalyst material. The photocatalyst may be dispersed over the surface of the matrix material by dissolving or suspending the photocatalyst in a common solvent.

An example metal precursor mixture includes at least one metal compound, such as a platinum compound, iron compound, cobalt compound, or combination thereof. A mixture of metal compounds may be used to form alloy particles, including platinum alloy particles such as platinum alloy particles (such as platinum-iron or platinum-cobalt alloy compounds.

Metal precursors are the metal compounds that are photocatalytically reduced, and may include one or more of the following metal atoms: Pt, Sn, Fe, Co, Cr, Ni, Nb, V, Mo, Mn, Pd, Ru, Zr, Ir, Rh, or V. Alloy particles may be formed by using a corresponding mixture of metal precursors. For example, a cobalt compound and platinum compound may both be catalytically reduced to form a platinum-cobalt alloy particle, and the alloy composition controlled by the ratio of the metal precursor compounds.

The matrix material may include vesicles, or other materials. The catalyst material may be formed by reduction proximate to, on, or within the matrix material. The photocatalyst and illumination may be omitted. Catalysts may be formed by reduction of a precursor, and the reducing agent may comprise sodium ascorbate or hydroquinone. Other reducing agents may be used, and the invention is not limited to these specific examples.

A photocatalyst may optionally be used. Example photocatalysts include metal porphyrins and other organometallic materials. An example photocatalyst is Sn(IV)octoethylporphyrin dichloride. Example photocatalysts include materials yielding a long-lived triplet state on exposure to visible or UV light, and yielding a radical anion by reaction with a reducing agent.

Whichever preparation method is used, the matrix material or other unwanted components may be removed before use as a catalyst.

A support material, such as an electron conducting material, may be present in a mixture used for preparation, or the catalyst may be combined with the support material later. In one approach, a photocatalyst is dispersed on the support material surface, and then the photocatalyst-coated support material is combined with the reducing agent and the metal compound into a mixture. The photocatalyst may be dispersed over the surface of the support material by dissolving (or suspending) the photocatalyst and support material in a common solvent, then evaporating the solvent. The matrix material may include the support material.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. A membrane-electrode assembly (MEA) comprising:
a first electrode;
a second electrode;
an ion-conducting membrane located between the first electrode and the second electrode,
the first electrode including dendritic nanostructures which act as an electrocatalyst during operation of the membrane-electrode assembly,
the dendritic structures being dendritic nanosheets, the dendritic nanosheets being generally disk-shaped.

2. The membrane-electrode assembly of claim 1, wherein the dendritic nanostructures comprise a transition metal.

3. The membrane-electrode assembly of claim 1, wherein the catalyst comprises a plurality of metal dendrimers.

4. The membrane-electrode assembly of claim 3, wherein the first electrode comprises an electron-conducting material, at least some of the metal dendrimers being supported on the electron-conducting material.

5. The membrane-electrode assembly of claim 4, wherein the electron-conducting material includes graphitic carbon.

6. The membrane-electrode assembly of claim 1, wherein the ion-conducting membrane is a polymer electrolyte membrane.

7. A fuel cell including the membrane-electrode assembly of claim 1.

8. The membrane-electrode assembly (MEA) of claim 1, wherein the dendritic nanostructures are partially fused together to define a catalytic porous sheet including the dendritic nanostructures.

9. The membrane-electrode assembly of claim 1, the dendritic nanostructures including platinum.

10. A fuel cell, comprising:
a first electrode;
a second electrode; and
an electrolyte located between the first electrode and the second electrode,
the first electrode including an electron-conducting material and a catalyst,
the catalyst including dendritic structures, the dendritic structures being metal dendrimers including platinum,
the dendritic structures having branched arms, the dendritic structures being dendritic nanosheets, the dendritic nanosheets being generally disk-shaped nanosheets.

11. The fuel cell of claim 10, the dendritic structures being partially fused together to form a catalytic porous sheet,
the catalytic porous sheet including pores having pore diameters in a range 1 nm-10 nm.

12. The fuel cell of claim 11, the catalytic porous sheet including pores having pore diameters in a range 2 nm-5 nm.

13. The fuel cell of claim 10, at least some of the metal dendrimers having a single crystal structure.

14. The fuel cell of claim 10, the carbon being graphitic carbon.

15. The fuel cell of claim 10, the electrolyte being an ion-conducting membrane.

16. The fuel cell of claim 15, wherein the ion-conducting membrane is a polymer electrolyte membrane.

17. The membrane-electrode assembly (MEA) of claim 1, the dendritic structures being formed by seeding on metal nanoparticles.

18. The fuel cell of claim 10, the dendritic structures being formed by seeding on metal nanoparticles.

19. The membrane-electrode assembly of claim 1, wherein the generally disk-shaped dendritic nanosheets define a diameter between 1 nm and 1000 nm, and a thickness between 1 nm and 10 nm.

20. The membrane-electrode assembly of claim 19, wherein the generally disk-shaped dendritic nanosheets define a diameter between 30 nm and 500 nm.

21. The membrane-electrode assembly of claim 1, wherein the dendritic structures include branched arms.

22. The membrane-electrode assembly of claim 1, wherein at least some of the dendritic structures are disposed directly on carbon within the first electrode.

23. The fuel cell of claim 10, wherein the generally disk-shaped dendritic nanosheets define a diameter between 1 nm and 1000 nm, and a thickness between 1 nm and 10 nm.

24. The fuel cell of claim 23, wherein the generally disk-shaped dendritic nanosheets define a diameter between 30 nm and 500 nm.

25. The fuel cell of claim 10, wherein the dendritic structures include branched arms.

26. The fuel cell of claim 10, wherein at least some of the dendritic structures are disposed directly on carbon within the first electrode.

* * * * *